(12) United States Patent  
Thomas

(10) Patent No.: US 6,845,948 B2  
(45) Date of Patent: Jan. 25, 2005

(54) ADAPTABLE KITE/AIRFOIL

(75) Inventor: Paul J. Thomas, 256 Causeway St., Medfield, MA (US) 02052

(73) Assignee: Paul J. Thomas, Medfield, MA (US)

( * ) Notice: Subject to any disclaimer, the term of this patent is extended or adjusted under 35 U.S.C. 154(b) by 0 days.

(21) Appl. No.: 10/361,957

(22) Filed: Feb. 10, 2003

(65) Prior Publication Data

US 2003/0150957 A1 Aug. 14, 2003

Related U.S. Application Data

(60) Provisional application No. 60/355,048, filed on Feb. 8, 2002.

(51) Int. Cl.[7] .............................................. B64C 31/06
(52) U.S. Cl. .................................................. 244/155 A
(58) Field of Search .................... 244/153 R–155 A, 244/218, 219, 49

(56) References Cited

U.S. PATENT DOCUMENTS 1,029,010 A * 6/1912 Guillo .................... 244/153 R
2,023,939 A * 12/1935 Talmadge ................... 244/154
2,193,029 A * 3/1940 Juul ............................ 244/218
3,152,778 A * 10/1964 Girard .......................... 244/46
3,507,464 A * 4/1970 Rogallo ........................ 244/46
4,685,410 A * 8/1987 Fuller ......................... 244/218
5,052,641 A * 10/1991 Coleman .................... 244/218

* cited by examiner

Primary Examiner—Galen Barefoot

(57) ABSTRACT

An Adaptable kite/airfoil preferably for structured kites having effectively "reefable" sub-section(s) typically changing the effective width and/or length of the airfoil, thereby substantially changing the aerodynamic characteristics of the airfoil, using continuous sheet material sections not separated in flight use or in changing the kite aerodynamics. Thus, all of the sheet material, skin of the kite remain with the kite in its various configurations. Seven exemplary embodiments which achieve this approach are described including (1) roll-up section(s) (FIGS. 2A & 2B); (2) integrally contiguous, fold over, over-lapped section(s) (FIGS. 3 & 5); (3) continuous but not integrally contiguous, overlap section(s) using a telescoping arrangement (FIGS. 4A–4C); (4) varyingly compressed and/or aligned battens (FIGS. 5–6); (5) variable wing tips (FIG. 7); (6) center pull-down or up (FIGS. 8 & 9); and (7) in flight expandable/contractible center pulled up or down (FIG. 10).

14 Claims, 10 Drawing Sheets

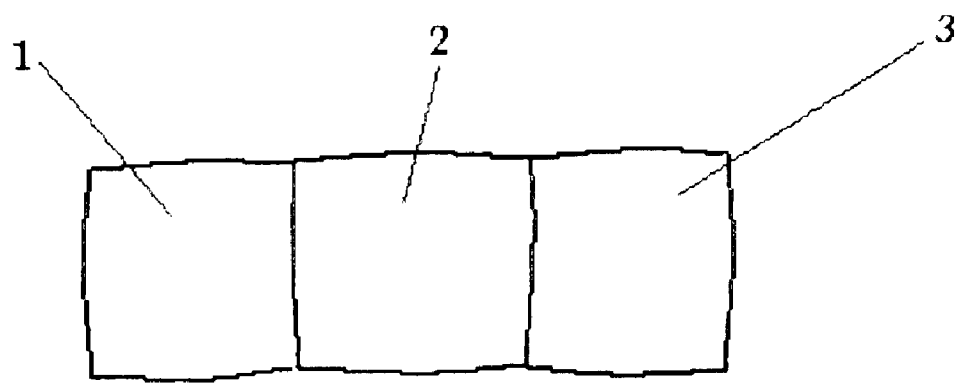
Fig. 1A "Prior Art"
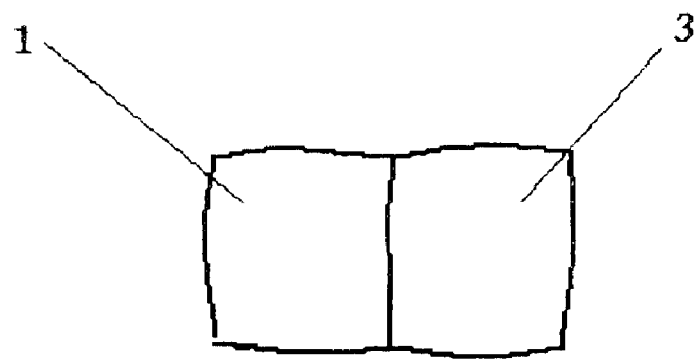
Fig. 1B "Prior Art"

ADAPTABLE KITE/AIRFOIL

REFERENCE TO RELATED PATENT APPLICATION

This application has the benefit of provisional patent application Ser. No. 60/355,048 filed Feb. 8, 2002 entitled "Kite/Airfoil 'Reefing' System."

TECHNICAL FIELD

The present invention relates to a kite/airfoil structure in which a Variable sub-system or other comparable means is used to significantly change the aerodynamic characteristics of the kite/airfoil and in particular its size in either or both its effective width or length and/or airfoil cross-section shape and more particularly to structured kites which include one or more, usually two or more, structural members which shape the kite and which effectively has continuous, sometimes even integrally contiguous sections (that is, of the very same sheet(s) of material) of fabric or other types of kite/airfoil skin material supported or shaped by the structural members or a material that has a structure of it's own, although some of the principles of the present invention can be used with some non-structured kites.

BACKGROUND ART

The growing interest in power kites has created a need for a kite that can adapt to different wind conditions. Power kites are being used on the water and land, snow or ice. They typically are controlled by two to four (2–4) lines and generate as much pulling power as, for example, a small motorboat. When the wind increases too much, this power can become uncontrollable, and, when it dies down, the kite-boarder can be left stranded.

Designs, which once made are non-variable within the airfoil itself, have been developed in the prior art that allow kites to have a larger wind speed range. This has been done by changing the efficiency of the particular foil or by changing the angle of the airfoil with respect to the wind.

It is also known in the kite field to have a kite with no structural support members in them, namely, an bridled ram-air kite, which includes a set of zippered parafoil sub-sections, allowing one or more to be added or subtracted from the kite to change its aerodynamic characteristics for a kite traction system, noting, for example, the web site for the "SPIDER MODULUS" (www.spidertraction.ic24.net/), copies of pages of which are included in the PTO application file of this application. A parafoil, as described on this web site, is a fully soft inflatable wing, which are familiar in the sports of hang gliding and parachuting. For kite traction the design is modified somewhat but the principles of using air inflated wings are similar. There are no spars or solid cross members which means, according to the web site, that the weight and storage volume can be kept to a minimum. One of the most notable factors in the use of parafoils for traction, according to the web site, is their exceptional power potential for their given weight and durability.

It also is known to, for example, roll-up the terminal tips of a inflatable kiteboard kite to be able to change from a triangular point tip, two line attachment arrangement to a four line (two lines at each end) arrangement, line attachment system. However, unlike the present invention, this approach does not effectively or significantly change the airfoil characteristics of the kite but only the type of line attachment for a different control of the kite, typically for de-powering of the kite.

Two prior patents currently known to the inventor are U.S. Pat. Nos. 5,366,182 (Nov. 22, 1994; Roeseler) and 6,273,369 (Aug. 14, 2000; Nishimura et al).

With respect to the present invention, the exemplary embodiments of the Adaptable kite/airfoil using physical means which basically stay with the kite body, substantially and innovatively expand on these advances, as will be described below, using integral variable means to variably change the airfoil size and/or also shape and hence the aerodynamic characteristics of the kite/airfoil, allowing, for example, the kite/airfoil to be variably used for extended or changed wind speed conditions, particularly but not necessarily exclusively, for structured kites.

GENERAL SUMMARY DISCUSSION OF INVENTION

Thus, the present invention provides a Adaptable kite/airfoil which has, for example, an effectively "reefable" sub-section or portion which typically changes the effective total, lateral width or length of the airfoil, thereby substantially changing the aerodynamic characteristics of the airfoil and, for example, the wind speed range it can best be used in, with the "reefable" sub-section preferably but not necessarily being variable, allowing the same kite/airfoil to be used, for example, in a number of different wind speed ranges and, for further example, for different weight users when the user uses the airfoil for "flying," for example, in kite boarding.

The invention thus allows the user to effectively and easily remove from action or effectively add to a significant portion of the kite or "foil" with respect to its airfoil interaction with the wind, if not from the kite itself while always maintaining all of the flexible sheet material or skin material of the kite on the kite, that is, without any physical removal of kite sections away from the rest of the kite. By changing the effective amount and/or configuration of the foil that is available to be flown in the wind, it will increase the wind range of the kite or foil and allow it to be used, for example, for a wider range of user weights over a larger wind speed range. In significantly changing the airfoil characteristics of the kite, the change to the airfoil can be made in changing either the effective lateral width of the airfoil or its longitudinal depth or length or a combination thereof and/or the curvature of the structured kite/foil itself and/or the configuration of the central front portion of the kite foil.

Seven, exemplary, different, independent approaches of the invention are described, namely, using:
1. Roll-up section(s);
2. Fold over (over-lapped) section(s);
3. Overlapped, sliding section(s) using, for example, a telescoping arrangement;
4. A combination of a contour changing of the air foil and the approaches of 1–3 or 4;
5. Foldable wing tips in, for example, a delta-type kite; and/or
6. Foldable or relatively moveable sections, allowing the central part of the kite, to be moved up or down under the pull of a control line extending down to the user changing, for example, a continuously curved disposition of the kite foil to a centralized "V" shape disposition.
7. A means for triggering the collapsing or expanding sliding/overlapping section of the kite while in the air Thus, in another, independent aspect of the present invention the curvature of the kite/foil is varied and designed to allow the user to adjust or otherwise vary the aerodynamics of the kite to suit the wind condition and the ability of the user. The variable curvature kite/foil is made so that the user can change the total area of the kite that is exposed to the wind and to change the cross-sectional shape of the airfoil. Various exemplary modes to achieve this aspect of the invention are discussed below.

As should be understood, the exemplary embodiments of the Adaptable kite/airfoil of the invention, which allow the skin portion of the kite/airfoil to stay with the kite body, use integral variable means to variably change the airfoil size and/or also shape and hence the aerodynamic characteristics of the kite/airfoil, allowing, for example, the kite/airfoil to be variably used for extended or changed wind speed conditions, particularly but not necessarily exclusively for some aspects of the invention, for structured kites.

Such kites typically have at least one or more typically at least two structural members that shape the kite body and support and shape the flexible sheet material that forms the rest of the basic kite body and are sometime called frame kites or rigid kites, in contrast to soft or ram air kites that need an elaborate harness system in association with the wind and air pressure to give the kite its shape. The structural members in a structured kite typically are in the form of rigid rods or flexible battens or the like, but also could include some inflatable or foam type structural members.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1A is a plan view of a simplified, prior art design having a physically removable, zippered-in, center section in an exemplary three-section kite/airfoil of an unstructured, parafoil kite; while FIG. 1B is a plan view (like that of FIG. 1A) of the simplified, prior art design of FIG. 1A but with the center, removable section of the kite/airfoil of the unstructured kite physically removed with the two end sections then joined together by zippers, substantially changing the lateral width and hence the aerodynamic characteristics of the kite/airfoil.

FIG. 2A is a front view of a first, exemplary embodiment of the reefable kite/airfoil for preferably a structured kite of the present invention, with this embodiment having a rolled-up, center section effectively changing the lateral width of the kite/airfoil and hence likewise substantially changing the aerodynamic characteristics of the kite/airfoil, it being noted, as can be seen, that the flexible sheet material is integrally contiguous and continuous; while

in FIG. 5B the batten is attached to the kite/foil's leading edge in a same batten angle that is used in FIG. 5A and with the distal end of the compression line attachment moved closer to the leading edge producing a harder or higher leading edge kite/foil configuration compared to that of FIG. 5A and also moving the camber closer th the leading;

in FIG. 5C the batten is attached to the kite/foil's leading edge in the same batten angle as that used in FIG. 5A with the distal end of the compression line attachment also the same as FIG. 5A but the batten is replaced with a tapered batten which also moves the camber closer to the leading edge;

in FIG. 5D the batten is attached to the kite/foil's leading edge in a different batten angle than that used in FIG. 5C moving the camber even closer to the leading edge and producing an even harder or higher leading edge kite/foil configuration compared to that of FIG. 5C.

FIG. 6 is a side view of another, exemplary embodiment, similar to that of FIGS. 5 and 5A–D, but illustrating another approach to varying the effective compression string or line length by moving a line coupling ring moveable along different longitudinal spaced positions along its respective batten to effect desired changes in the curvature of the kite's air foil; while

EXEMPLARY MODES FOR CARRYING OUT THE INVENTION

Removable Zippered Sections, Prior Art Design (FIGS. 1A & 1B)

With reference to the prior art design of FIGS. 1A & 1B, an unstructured parafoil is made with, for example, three or more sections, for example, a first, zippered, end section 1, a central, zippered section 2 and a second, zippered, end section 3. By, for example, unzipping and physically removing the center section 2 and then zipping together the other, two, end sections 1 & 3, a smaller parafoil having a substantially less lateral width, as shown in FIG. 1B, is produced, resulting in a parafoil having substantially different aerodynamic characteristics than the initial parafoil disposition or configuration shown in FIG. 1A.

The simplified drawings of FIGS. 1A & 1B are intended in this specification to represent in simplified form a parafoil having no structural support members in it, namely, an unstructured parafoil, which includes a set of zippered, parafoil sub-sections, allowing one or more to be added or subtracted from the kite to change its aerodynamic characteristics for a kite traction system, such as that, for example, described on the web site for the "SPIDER MODULUS" (www.spidertraction.ic24.net/), copies of pages of which are included in the PTO application file of this application. A parafoil, as described on this web site, is a fully soft inflatable wing, which are familiar in the sports of hang gliding and parachuting. As noted on the prior art web site, for kite traction the design is modified somewhat but the principles of using air inflated wings are similar. There are no structural spars or solid cross members in the unstructured parafoil of this prior art design.

The "SPIDER MODULUS" parafoil system can include many, removable and addable, zippered sub-sections, from a minimum of one to a zippered-together combination of many, forming the desired width size and type of parafoil at any particular time.

In contrast to this prior art design, the present invention preferably is directed to structural kites in which one or more, typically at least two, structural members are included in the kite structure, to form the structured kite body using flexible sheet material carried and configured or shaped by the structural members. In the parafoil of the "SPIDER MODULUS" approach, the aerodynamic foil is formed by the ambient air pressure or wind against the parafoil in combination with the retarding forces of the user's harness or control lines extending down to the user. Also in contrast to the "SPIDER MODULUS" approach, in which the unzipped sub-sections are physically removed away from the parafoil and left, for example, on the ground, while in the present invention adjacent sections of the flexible sheet material are relatively moved with respect to one another, while still being connected to the rest of the kite material to change the aerodynamic characteristics of the kite. These contrasts will be seen in the exemplary embodiments of the invention described below.

Figure 2A:
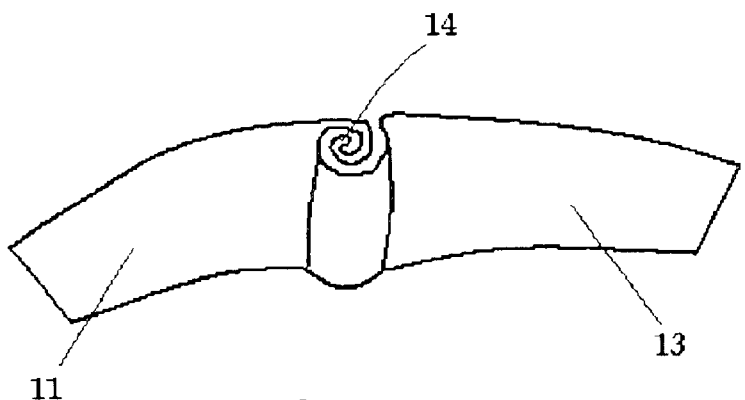
Figure 2B:
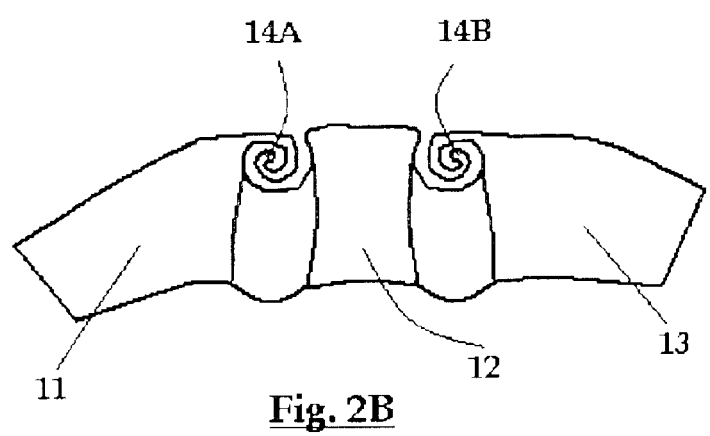
FIG. 2B is a front view of an alternative, second, exemplary embodiment of the Adaptable kite/airfoil for preferably a structured kite of the present invention, with this embodiment having two rolled-up, side section likewise effectively changing the lateral width of the kite/airfoil and hence likewise substantially changing the aerodynamic characteristics of the kite/airfoil, it being noted, as can be seen, that the flexible sheet material is integrally contiguous and continuous.

Roll-Up Section(s), Exemplary Embodiments (FIGS. 2A & 2B)

Instead of physically removing sections of an unstructured parafoil, as in the prior art design of FIGS. 1A & 1B, the kite was made with reefing-type tied, sections 10 & 12 which are rolled (or gathered) up and tied (held) so that the kite, preferably of a structured type, flies with less airfoil surface area, as for example, is illustrated in the alternate embodiments of FIGS. 2A & 2B. The embodiment of FIG. 2A includes a single, central, roll-up portion 14, with, as can be seen, end sections 11 & 13, while the embodiment of FIG. 2A includes two, roll-up, end portions 14A & 14B, with, as can be seen, end sections 11 & 13 and a center section 12.

As can be seen in both of these figures, the central roll-up section 14 and the spaced, roll-up sections 14A & 14B are each made of integrally contiguous, continuous, flexible sheet material, which is likewise integrally contiguous and continuous with the flexible sheet material forming the end sections 11 & 13 and with the end sections & central section 11–13, respectively. Thus, in contrast to the removal or addition of separable, zippered parafoil section of the prior art approach of FIGS. 1A & 1B, all of the flexible sheet material and any and all structural members stay with the kite, with the sheet material being continuous, if not also integrally contiguous material, inseparable from the other sections of sheet material.

Also, a combination of the two embodiments, alternatively, could be used. Also, the flexible sheet material that is gathered up may be, for example, hid inside a slot or a bladder or a pocket, if so desired. Of course, the rolled-up sections 14, 14A & 14B could be un-rolled adding to the effective width of the kite's airfoil.

Fold-Over Section, Exemplary Embodiment (FIGS. 3A & 3B)

Figure 3:
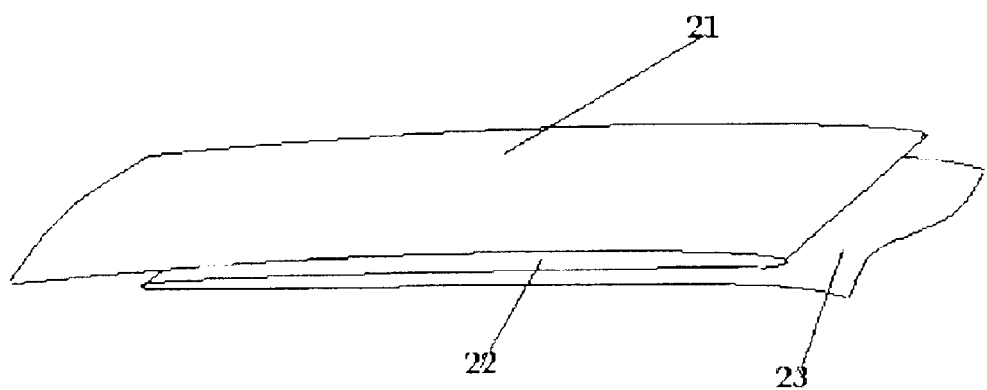
FIG. 3 is a partial, perspective view of a foldable section of a third, exemplary embodiment of the Adaptable kite/airfoil of the present invention, with this embodiment having a fold-over, center section effectively changing the lateral width of the kite/airfoil and hence likewise substantially changing the aerodynamic characteristics of the kite/airfoil.

With reference to FIG. 3, another option or alternative approach would be to include in the airfoil area one or more fold-over sections each of which is held in place by, for example, ties or other appropriate fastening means (for further example, "VELCRO®" type hook and loop material, etc.). As can be seen, in the exemplary embodiment of FIG. 3, three such fold-over sections 21, 22 & 23 are included. As should be understood by those of ordinary skill, the effective width of the airfoil is decreased by increasing the fold-over or over-lapped portions or decreased by unfolding or decreasing the amount of over-lap of the sections or sheet material areas 21, 22 & 23. Also, as can be seen in the exemplary embodiment of FIG. 3, the flexible sheet material is both continuous and integrally contiguous throughout its length and width.

Figure 5:
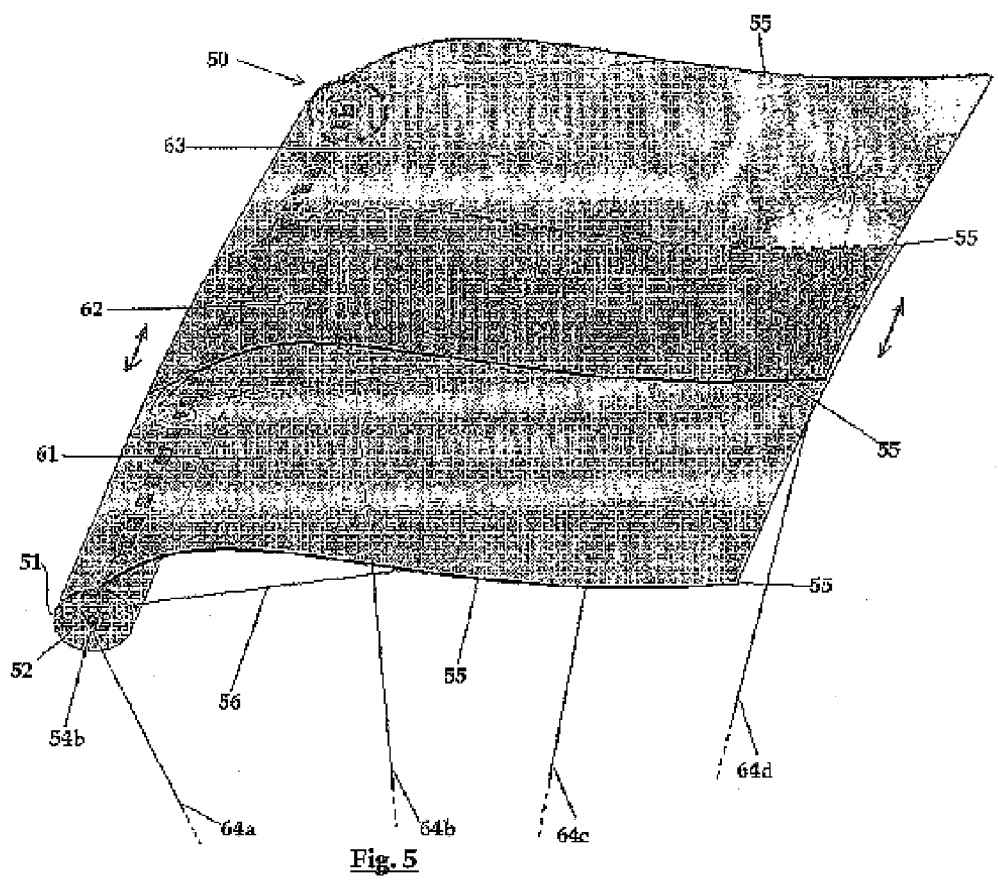
FIG. 5 is a top, perspective view of a kite incorporating a further exemplary, embodiment of the present invention in which the kite/foil includes a series of structural battens or like structural members spaced laterally along the kite's width in which either or both the leading edge configuration and the following curvature of the battens is varied to change the aerodynamics of the kite foil, as well as incorporating a further exemplary, overlapped embodiment of the present invention in which the kite/foil includes a central section which can be expanded and contracted (comparable to the embodiment of FIGS. 4A and 4B) to vary the effective lateral width of the kite/foil with integrally contiguous, continuous, flexible sheet material.

It is noted that this over-lapping approach of this embodiment is effectively incorporated in the embodiment of FIG. 5, noting over-lapping or fold-over section 62 positioned between the two, opposed, end sections 61 & 63.

Figure 4A:
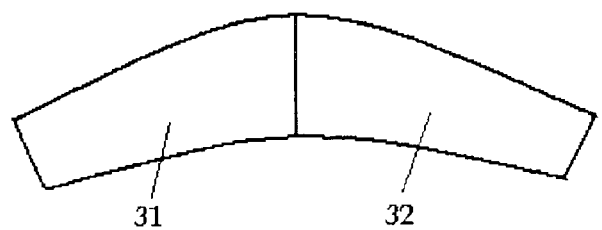
FIGS. 4A & 4B are substantially identical, plan views, of a fourth, exemplary embodiment of the Adaptable kite/airfoil of the present invention, with this embodiment having a telescoping, center section which allows the effective changing of the lateral width of the kite/airfoil and hence likewise substantially changing the aerodynamic characteristics of the kite/airfoil.
Figure 4B:
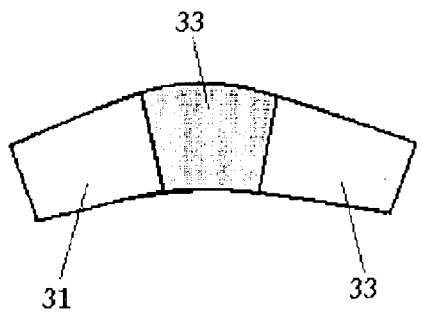
Figure 4C:
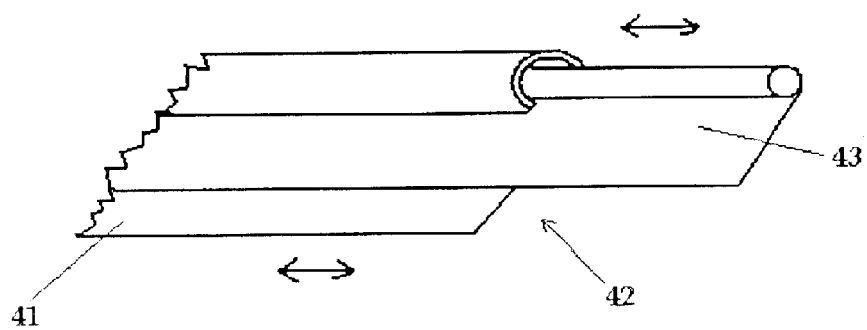
FIG. 4C is a close-up, partial, perspective view of a detail of the embodiment of FIGS. 4A & 4B, showing an exemplary telescoping arrangement for varying the effective width of the center section of the kite/airfoil.

Sliding Section, Exemplary Embodiment (FIGS. 4A–C)

In this approach and with reference to FIGS. 4A–C, the kite is made of two or more pieces, for example, pieces 31

& 33, that slide or telescope together. In comparing FIG. 4A and FIG. 4B, the shaded area in FIG. 4B designates the kite/airfoil's overlapped, sliding area 32. With this sliding/overlapping, one effectively achieves the same thing as removing this area from the wind, while still, as would be understood by one of ordinary skill, all of the material of sections 31 & 33 remain as part of the kite and form a continuous layer of sheet kite material.

The sliding overlap sub-system could slide the kite material in more than one direction and therefore change both the effective width and depth (length) of the kite. It is noted that the overlap systems of the present invention may not work for "ram air" foil kites. Ram airfoil kites, however, may work well with a system approach that collapses the inflated cells of the foil.

Today's "power kites" used, for example, for kite-boarding on the water, are made to float when they land in the water. Some have inflatable bladders on their leading edge. This bladder may need to be rolled up when "reefing" the kite in accordance with the present invention.

A design may use foam or other flotation materials or structures to support the leading edge, coiled if desired. Having a sliding or telescoping track 42, as shown in FIG. 4C, on the leading edge (between, as seen, sub-sections 41 & 43) would be a way to keep the strong leading edge.

More than one sliding track may be used, if so desired, to achieve the proper airfoil shape. Additionally, sliding tracts of many pieces tracts may telescope together so they could cover a longer area but collapse to a smaller size. By changing out structural members of different length a user could do the same as a telescoping member which could save weight but loose convenience.

The sliding/overlap and roll-up systems of the present invention can be designed, if so desired, to be controlled from the ground by the user. For example, the sliding/overlap section(s) could be pulled together or let spread apart by, for example, having an extra line controlling the amount of overlap by the ground-based user or, for that matter, a flying type, kite-supported user.

Alternatively, the roll-up section(s) of the kite/foil could also be reefed with the use of a wireless device that could wind up or release a portion of the kite/foil material. A simple solenoid, for example, could be used to lock the sliding portion of a kite/foil once it is set to a new position. By having these remote type of controls for the kite/foil, one could, for example, expand the use and safety of a kite/foil type of sport.

Variable Kite/Foil Curvature Using Variably Positioned Compression Lines (FIGS. 5, 5A–D, 6 & 6A)

This exemplary embodiment of the present invention is directed to a structured kite/foil designed to allow the user to adjust or otherwise vary the aerodynamics of the kite to suit the wind condition and the ability of the user. The variable curvature kite/foil is made so that the user can change the total area of the kite that is exposed to the wind and to change the cross-sectional shape of the airfoil. Various exemplary modes to achieve this aspect of the invention are discussed below.

In using a kite for kite-boarding on the water, one of the more popular designs of the prior art has a leading edge and struts that are inflatable. Instead of inflating bladders for floatation, the exemplary approach of this embodiment of the present invention has molded pieces of closed cell foam that keeps the kite on top of the water. Since there are many different types of foam, it is possible use lighter foam with less structural strength and reinforce it with, for example, carbon rods or battens as structural members. In the exemplary, substantially modified, ram air design of the present invention illustrated in FIG. 5, the front, leading edge is made from a long, elongated, foam cylinder 52 (or, alternatively, for example, oblong or elliptical, etc. in cross-sectional shape) having holes with air valves to allow the kite to inflate. The exemplary, substantially modified, ram air design also could have some cells filled with foam to keep the whole kite above the water surface.

The exemplary embodiment 50 of FIG. 5, which include a series of flexible, laterally spaced structural rods or battens 55, could be single skinned as illustrated, similar to today's inflatable kites made by Naish or Wipika, or traditional power kite made by companies like Peter Lynn. In both cases of single skin or ram air, the structured kite 50 allows for two types of changes in the airfoil shape and size.

When the size or disposition of the cylindrical foam body 52 at the leading edge is changed or the connection of the battens 55 to the leading edge structure is changed, the kite 50 has a different aerodynamic shape. As is known, the use of battens 55 running from the leading (proximal) to the trailing (distal) edge gives shape to the kite and, when they are flexed more by string(s) or line(s) 56 connected to the leading edge and some selected point further towards the trailing or distal edge, a different airfoil shape is produced. The angle of the batten attachment to the leading edge 51 also preferably are adjustable so the user can change the airfoil in that section of the kite. These same adjustment can be made with tapered battens if desired.

Providing the user with these available, kite/foil curvature adjustments provides the kite 50 with a greater wind range and different characteristics. These variables plus the ability to reef or expand the kite in total size expands the usable range of the kite 50 compared to any kite being used today. These user implemented adjustments will be seen fully in connection with FIGS. 5A–D, 6 & 6A.

An outline of the reference numbered elements used in FIGS. 5A–D and 6 & 6A is:

| | |
|---|---|
| kite/foil embodiment | 50 (FIG. 5) |
| kite/foil embodiment | 50a (FIG. 6) |
| leading edge | 51 |
| foam body | 52 |
| batten connection | 53 |
| angle clamping member element | 54a |
| tubular shaft | 54b |
| shaft receiving hole | 54c |
| flexible batten | 55 |
| string/line | 56 |
| supplemental line section | 56a |
| series of spaced slotted areas | 57 |
| adjustment screw | 58 |
| slot legs | 59 |
| moveable, string/line ring | 60 |
| opposed end sections | 61, 63 |
| center section | 62 |
| kite control lines | 64a–64d |
| center section | 62 |

Figure 5A:
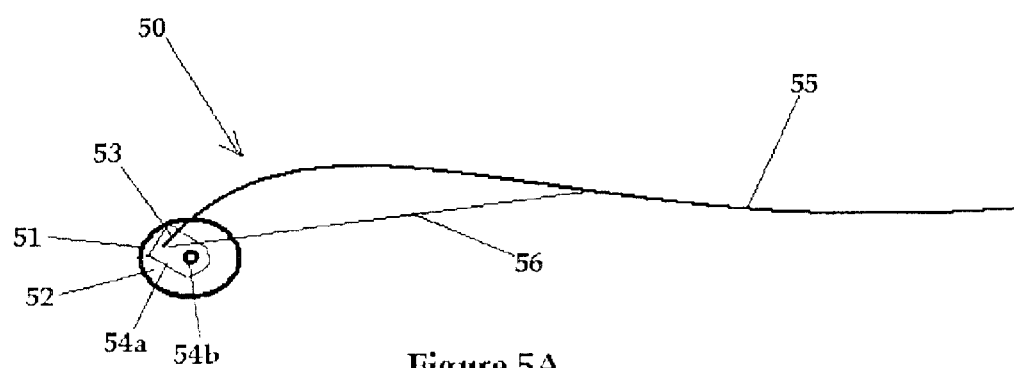
FIGS. 5A–D are simplified, cross-sectional, side views of the embodiment of FIG. 5, wherein in FIG. 5A an exemplary batten is attached to the kite/foil's leading edge in an initial batten angle with a compression string or line used to compress and form a first exemplary airfoil shape.
Figure 5B:
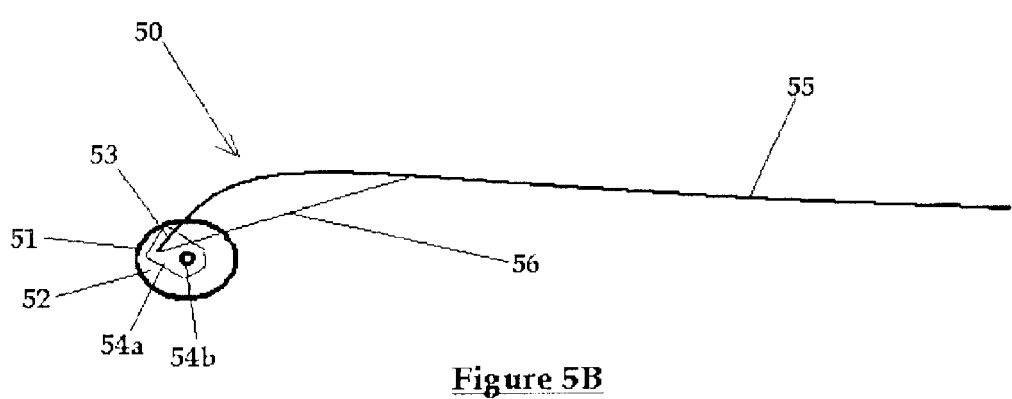
Figure 5C:
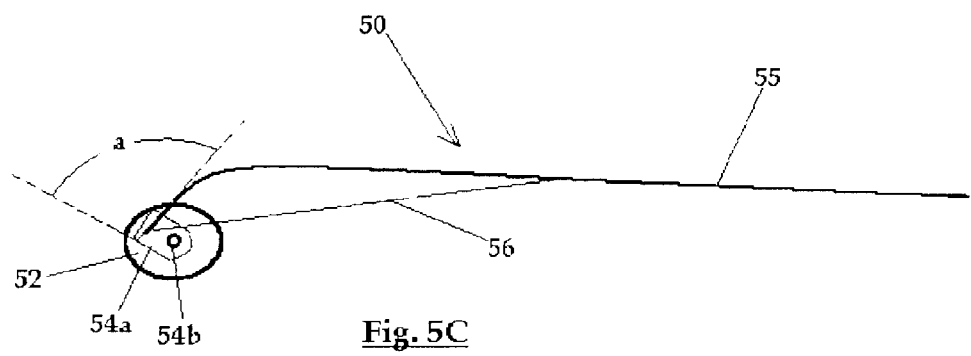
Figure 5D:
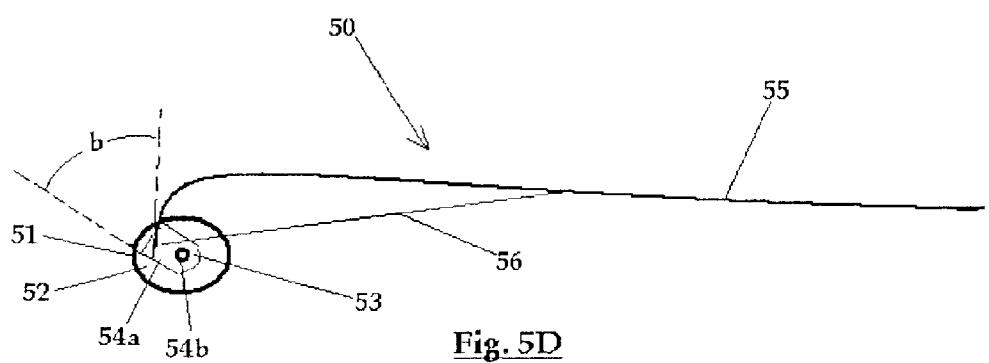

FIGS. 5A–D are simplified, cross-sectional, side views of the embodiment 50 of FIG. 5, wherein
   in FIG. 5A an exemplary batten 55 is attached to the kite/foil's leading edge 51 in an initial batten slot with the compression string or line 56 used to compress and form a first exemplary airfoil shape as illustrated in this figure;

in FIG. 5B the batten 55 is attached to the kite/foil's leading edge 51 with the distal end of the compression line (56) attachment moved closer to the leading edge producing a harder or higher leading edge kite/foil configuration and the camber of the airfoil is moved closer to the leading edge as illustrated in this figure compared to that illustrated in FIG. 5A;

in FIG. 5C the batten 55 is attached to the kite/foil's leading edge 51 in the same batten slot as that used in FIG. 5A but with the distal end of the compression line (56) attachment also the same as FIG. 5A but the batten is replaced with a tapered batten which also moves the camber closer to the leading edge as illustrated in this figure; and in FIG. 5D the batten 55 is attached to the kite/foil's leading edge 51 in a different batten slot than that used in FIG. 5C moving the camber even closer to the leading edge and producing an even harder or higher leading edge kite/foil configuration as illustrated in this figure compared to that illustrated in FIG. 5B.

It is noted that the distal end of the compression line 56 can be varied along the length of its associated batten 55 by using a number of different mechanical means, including, for example, individual selective tying of the distal end of the line to a selected one of a series of, for example, longitudinally spaced slots or protrusions or, for further example, using an extended member or button located at the distal end of the line 56 and selectively connecting it into a selected one of a series of spaced slot or holes in the batten 55. Another, alternative, exemplary approach will be described in connection with FIG. 6.

Figure 6:
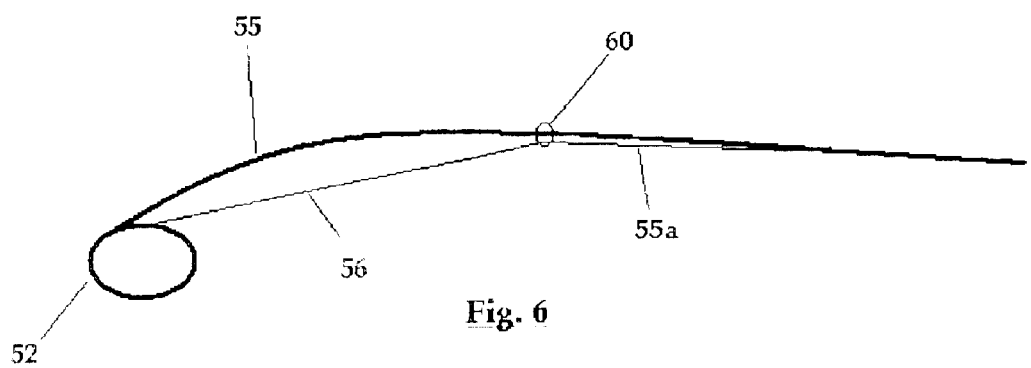

FIG. 6 is a side view of another, exemplary embodiment 50a, similar to embodiment 50 of FIGS. 5 and 5A–D, but illustrating another approach to varying the effective compression string or line length of the line 56+56a by moving a line enclosing ring moveable along different longitudinal spaced positions along its respective batten to effect desired changes in the curvature of the kite's air foil.

As shown in the alternative embodiment of FIG. 6, the proximal end of the compression string or line 56 is relatively "permanently" attached to the batten 55 at the proximal leading edge 51 (or thereabouts), as before, and the distal end of the line is relatively "permanently" attached to the distal or trailing edge of the batten or at least at some rearward located position back on the batten. The compression line 56 has its effective length changed by selectively positioning a loop or ring 60 through which the line passes at a selected position along the length of the batten 55.

As shown in FIG. 6, the compression string 56 thus is attached to the leading edge of the airfoil and then to effectively to the batten 55 at a point further back by means of the selected position of the loop or ring 60, with the remaining line 56a relatively "permanently" attached to the trailing edge and relatively ineffective with respect to the curvature of the batten. Hence, when the portion of string 56a going to the trailing edge (or from another point of view when line 56) is shortened or lengthened by appropriately moving the ring 60, it changes the position from which the batten 55 is compressed. It should be noted that, if the batten 55 starts to compress toward the tailing edge, the trailing, string portion 56a can be wound around the batten 55 a few times to eliminate this.

Alternatively, as noted above, the distal end of the compression string 56 could also just be attached at different, fixed points along the length of the batten 55, which preferably would have loops or hooks or other suitable means located for this purpose or other similar means. By use of the compression string 56, the rod or batten 55 is not only flexed properly but may also help stop the kite 50/50a from accidentally inverting itself.

Figure 6A:
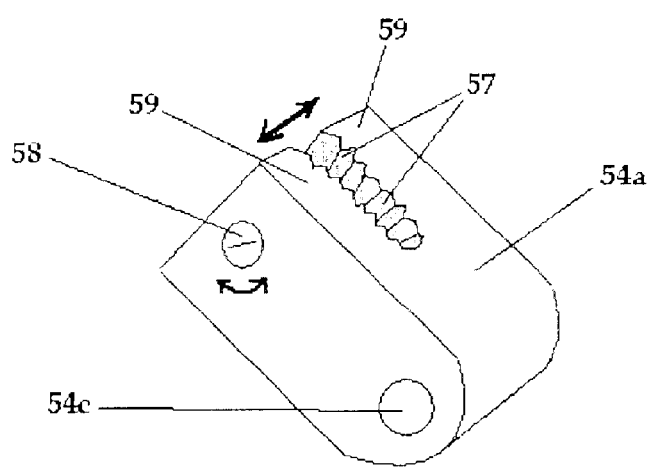
FIG. 6A is a close-up detail view of an individual member substantially the same as those shown in the embodiments of FIGS. 5 & 6 showing a number of means for clamping into which the proximal end of a batten can be selectively placed as desired, altering the leading edge of the kite/foil, and therein secured.

As can be seen in FIG. 6A, which is a close-up detail view of an individual cog element 54a on the tubular, cylindrical shaft 54b (see FIGS. 5–5D) which extends through the cylindrical hole 54c, is substantially the same as those shown in the embodiments of FIGS. 5 & 6. As can be further seen in FIG. 6A, each cog element 54a includes a set of varyingly positioned slotted areas 57 formed between the two leg segments 59 into which the proximal end of its respective batten 55 is selectively inserted.

When the batten proximal end is positioned in the selected slot area 57, the adjustment screw 58 is screwed in (note curved directional arrow) pulling the leg segments together (note straight directional arrow), locking the proximal, batten tip into the cog element 54a. This selected batten connection 53, depending on which one of the slotted areas 57 is selected, sets the initial angle (e.g., exemplary angles "a" or "b" of the batten 55 shown in FIGS. 5C & 5D) and, of course, many mechanical variations for this batten connections, including, for example, individual longitudinally spaced slots, are possible.

It should be noted that the foregoing, exemplary "reefing" (note the exemplary, expandable, over-lapped or "Z"folded areas 62, comparable to fold areas 21–23 of FIG. 3) and curvature variation rod or batten systems are designed to change the part of the kite's airfoil that gives lift in the wind, all while preferably keeping all of the flexible sheet material of the kite intact and connected. By changing the effective surface area in this region, one changes the aerodynamic characteristics of the kite/foil and, therefore, the range of use for the user is extended. It may also change the handling characteristics of the kite/foil, so as to, for example, quickly and easily change it from a beginner to a more advanced kite/foil or back to an easier handling system. In normal sport kites, this is believed to be particularly useful and novel.

It also should be noted that the inclusion of the exemplary, expandable an collapsible, over-lapped or "Z"folded area 62, which can have more or less layers than the exemplary three illustrated, comparable to folded areas 21–23 of FIG. 3) requires that the shaft 54b, at least in the central area 62 between the side sections 61 & 63, must be variable in its length in the lateral direction in order to allow the over-lapped area to be expanded and contracted as may be desired to change the effective width of the kite body. Of course, suitable fasteners are included to secure the over-lapped area(s) 62 to maintain the desired over-lap during flight.

Figure 7:
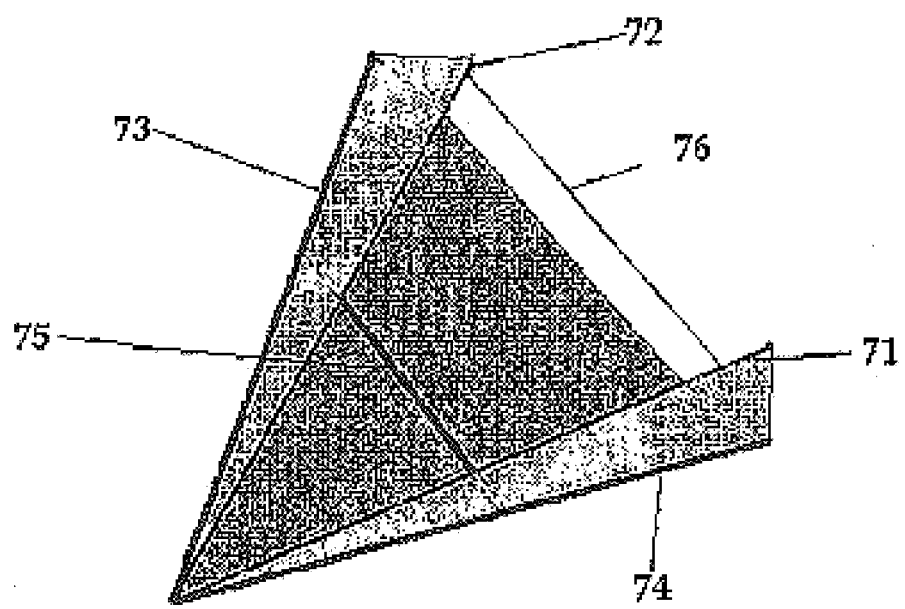
FIG. 7 is top, perspective view of still another embodiment illustrating a delta-type kite incorporating a further exemplary, folded over embodiment of the present invention in which the kite/foil includes two side sections or wing tips which are folded and the amount of fold can be changed to vary the effective lateral width of the kite/foil.

Variable Delta Kite/Foil, Exemplary Embodiment
(FIG. 7)

Another example for a fold over or overlap variable kite is shown in the structured kite 70 of FIG. 7. It is a simple delta style kite using two structural rods 71 and 72 attached to the sides of the kite material and two, other structural rods 73 and 74 that are spread by a rod 75 to give the wingspan of the kite. Spread rod 75 is of the type that inherently allows its length to be greater or less, as dictated by circumstances, using, for example, a spring biased rod have telescoping sections or positioned at a different location along 73 and 74

Line 76 is attached to rods 71 and 72 and tensioned to control the tightness of the material pulled over rods 73 and 74. If the length of the rod 75 is changed, the wingspan of the kite is changed and the tension of the material can be adjusted by line 76.

Thus, again, the aerodynamics of a structural kite are substantially changed by using continuous and, in this case, also integrally contiguous, flexible sheet material, with all of the material maintaining its connection to the kite in the varying dispositions and shapes or configurations.

Figure 8:
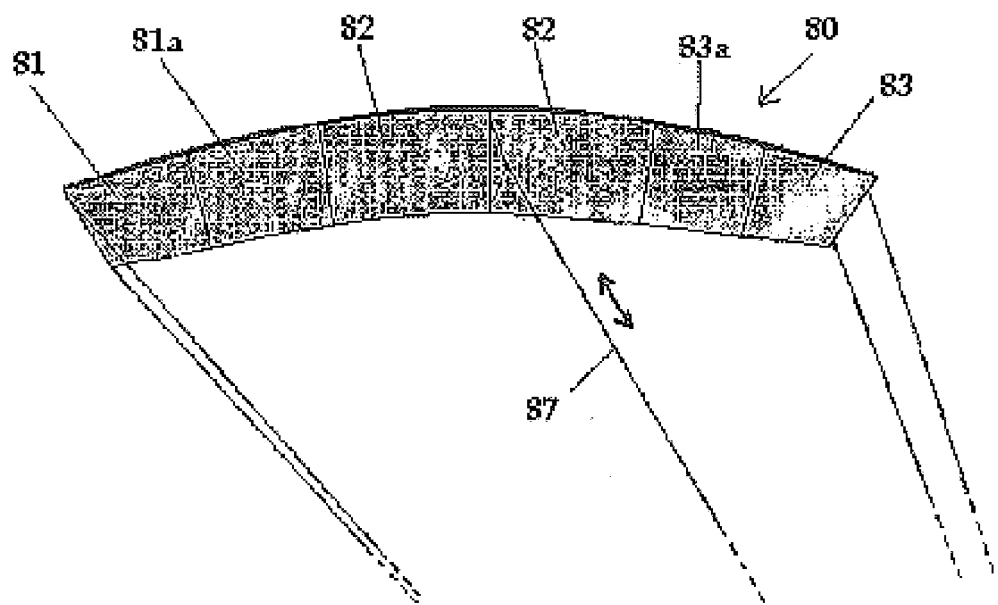
FIGS. 8 & 9 are bottom, perspective view of still another exemplary kite incorporating a further exemplary, embodiment of the present invention in which the kite/foil includes foldable or relatively moveable sections, in at least the central part of the kite, moved down or up under the pull of a control line extending down to the user, changing, for example, a continuously curved disposition (FIG. 8) of the kite to a centralized "V" shape disposition (FIG. 9).
Figure 9:
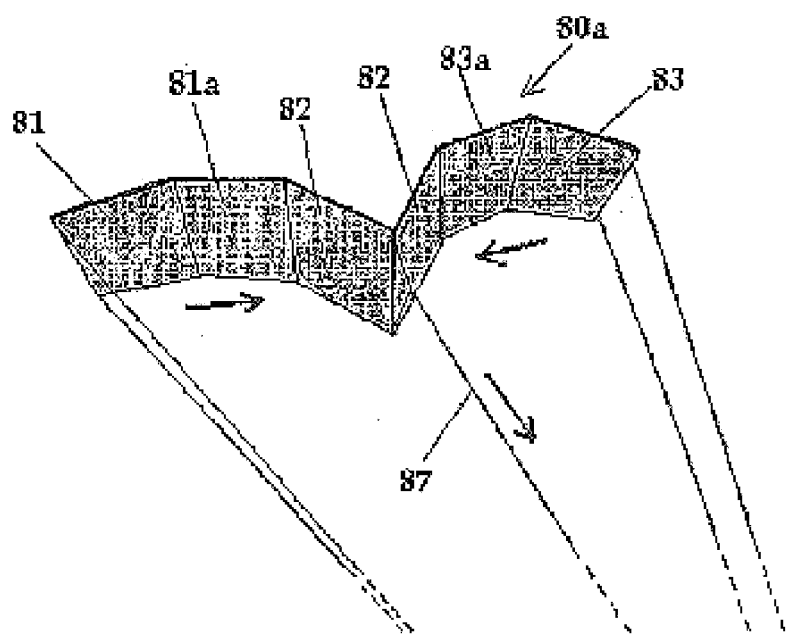

Variable Kite/Foil Using A Pull-Down Control Line (FIGS. 8 & 9)

FIGS. 8 & 9 are bottom, perspective views of still another exemplary kite 80/80a incorporating a further exemplary, embodiment of the present invention in which the kite/foil includes foldable or relatively moveable sections in at least the central part (82) of the kite, moved down under the pull of a control line 87 extending down to the user, changing, for example, a continuously curved disposition 80 (FIG. 8) of the kite to a centralized center "V" shape disposition 80a (FIG. 9) or if let out to form a more curved shape to the kite.

In one implementation with either a harnessed kite or more preferably a rigid, structured kite (with reference to FIGS. 8 & 9) a central, control line 87 going down to the ground, or at least down to the user controlling the kite, is attached near the leading edge and near the trailing edge along the centerline of the kite between the adjacent, center kite sections 82. The line preferably is longer than that distance by, for example, one and a half (1.5) times, to allow the folding/collapsing line 87, which is attached by a ring to it, to move freely forward and back.

When the folding/collapsing line 87 (see FIGS. 8 & 9) is pulled (note direction arrow), it tends to fold the kite down in half while still allowing its flying angle as controlled by the three (3) or four (4) other control line system to stay the same. This type of center folding system allows the user to adjust the amount of lifting/pulling force of the kite.

An advantage to this system is it gives a rigid kite a better emergency collapsing system by connecting the folding/collapsing line to the user and, if the user lets go of the kite bar, it collapses the kite and therefore makes it a safer kite. Another advantage is that it may make it easier for a kite to be re-launched because the user could pull up one side into the wind as the kite is floating or balanced on the other side.

However, the currently preferred embodiment is a rigid type, structured kite 80/80a that is "open" in FIG. 8 and "collapsed" or pulled down at its center in FIG. 9 by pulling on the center string or line 87 attached to the center structural member between the sections 82 of the kite. As can be seen in comparing FIGS. 8 & 9, the center sections 82 are not only pulled down with respect to its adjacent sections 81a/83a to form a "V", but also the sections 81a/83a are moved down a lesser amount with respect to their respective adjacent sections 81/83, changing the effective "curvature" of the kite as viewed from the perspective of its width.

Thus, again continuous flexible material continues to exist between the kite sections with the change in aerodynamic characteristics being achieved by moving one section relative to an adjacent section, with the adjacent sections rotating about the structural members (e.g., tubular rods) at the section edges serving as a moveable joints, without the removal or addition of any separable section of sheet kite material. Of course, if so desired, structural members (e.g., tubular rods) can also be positioned along the leading and/or trailing edges of the kite sections.

Variable Kite Using Collapsible Wings While Flying

Figure 10:
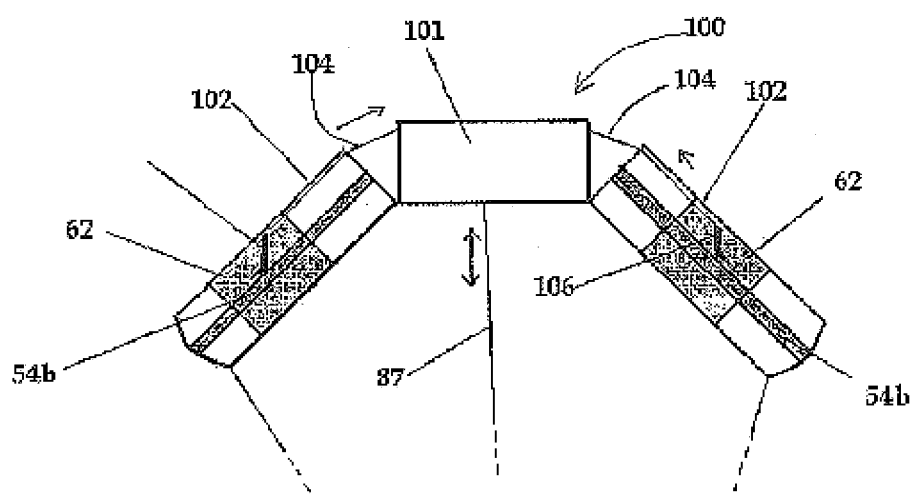
FIG. 10 is a front view if a kite including foldable wings that are variable in length similar but not necessarily the same to that in FIG. 5. These wings are locked in place by friction or a securing member and released when a line is stretched on the top of the kite for enlarging or another line on the bottom of the kite for contracting/shortening when the center is pulled down and a member is triggered to unlock the overlapping pieces of the wing and allow them to only contract/shorten or when released to enlarge them.

FIG. 10 shows a way to use FIG. 5 type overlap expandable wings with FIGS. 8 & 9 fold-up or fold-down type of kite. When the center section 101 is allowed to go up by letting out the center control line the wings 102 are dropped. This then pulls a line 104 on the top part of the kite that then unlocks the sliding wings. There are locking members 106 that stop the wings from expanding that are released and allow the wings to expand. These locking members controlled by the upper line will let the wings contract/shorten if the similar locking members, controlled by a lower string is pulled when the center section is pulled down. Similarly the lower members allow the wings to expand when the center section is let go up. In some embodiment there may not be a need for this novel line arrangement because friction may keep the sections in place when in a usual flying arrangement (all sections in a straighter line). Note this embodiment could be made with just 2 sections pivoting at the center or many sections possibly unlocked by a wireless control.

It is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A structured kite having a kite body with at least one flying line, comprising: at least two structural members, and flexible sheet material forming adjacent, continuous, inseparable sections forming the kite body carried on said structural members, said structural members supporting, configuring and determining at least in substantial part the aerodynamic characteristics of the kite body, said characteristics being changeable by means for relatively moving selected ones of said adjacent, inseparable sections of the sheet material relative to one another while still remaining connected together, the changes being made in flight by the moving of said selected ones of said sections by control of the at least one flying line.

2. The structured kite of claim 1, wherein said adjacent, inseparable sections comprise: over-lapped sections of continuous, integrally contiguous flexible sheet material, the means for relatively moving changes the effective size of the kite body and its effective aerodynamic characteristics by varying the amount of over-lap between said over-lapped sections.

3. The structured kite of claim 2, wherein the kite body has a longitudinal centerline and said over-lapped section has at least one fold axis, and wherein: said over-lapped section forms at least one "Z" shape in configuration made up of at least two folds.

4. The structured kite of claim 1, wherein said adjacent sections comprise: at least one rollable section of continuous, integrally contiguous flexible sheet material, the means for relatively moving changes the effective size of the kite body and its effective aerodynamic characteristics by varying the amount of roll of said rollable section.

5. The structured kite of claim 1, wherein said adjacent sections comprise: at least two telescoping sections each having a telescoping element, nested one with the other, the means for relatively moving changes the effective size of the kite body and its effective aerodynamic characteristics by said sections telescoping one within the other.

6. The structured kite of claim 1 wherein said at least one flying line has two lines for controlling the flying of said kite and a third bending line that when shortened or lengthened allows the middle part of the kite to move down or up with respect to the edges of the kite.

7. The structured kite of claim 1 wherein said at least one flying line has two lines for controlling the flying of said kite, at least one control line for tipping the front edge of the kite and an added bending line that when shortened or lengthened allows the middle part of the kite to be placed lower or higher with respect to the edges of the kite.

8. The structured kite of claim 1 wherein said kite includes structural battens being flexed by a line connected to the leading edge of said batten and a location further down the length of the said batten so as to bend a section of said batten to provide an airfoil shape to the kite.

9. The structured kite of claim 8 wherein said batten is connected to the leading edge of kite with adjustable cog for further bending said batten.

10. The structured kite of claim 6 or 7 which said sections are a portion of the kite that has two panels that overlap each other allowing for expansion and contraction of that portion of the structured kite.

11. The structured kite of claim 10 which has two overlapping/sliding sections on opposite sides of the structured kite.

12. The structured kite of claim 11 which has a mechanism that unlocks the sliding sections when the middle of the sections is pulled down allowing the sections to contract and to expand when the middle of the sections is allowed to go up.

13. The structured kite of claim 1 with closed cell foam along the leading edge.

14. The structured kite of claim 1 with an inflatable leading edge.

* * * * *

UNITED STATES PATENT AND TRADEMARK OFFICE
CERTIFICATE OF CORRECTION

PATENT NO. : 6,845,948 B2  
APPLICATION NO. : 10/361957  
DATED : January 25, 2005  
INVENTOR(S) : Paul J. Thomas It is certified that error appears in the above-identified patent and that said Letters Patent is hereby corrected as shown below:

Col. 12 should read:
1. A structured kite having a kite body with at least one flying line, comprising: at least two structural members, and flexible sheet material forming adjacent, inseparable sections ...

Col. 12 in claim 2 should read:
2. The structured kite of claim 1, wherein said adjacent, inseperable sections comprise: over-lapped sections of integrally ...

Signed and Sealed this

Fifteenth Day of August, 2006

JON W. DUDAS  
*Director of the United States Patent and Trademark Office*